Patented Dec. 15, 1953

2,662,856

UNITED STATES PATENT OFFICE 2,662,856

MINERAL OIL COMPOSITIONS

John W. Bishop, Plainfield, N. J., assignor to Tide Water Associated Oil Company, New York, N. Y., a corporation of Delaware No Drawing. Application January 11, 1951, Serial No. 205,607

11 Claims. (Cl. 252—32.7)

The present invention relates to novel mineral oil compositions and, particularly, to improved mineral oil compositions adapted for use as lubricants.

In the lubricating field, extensive usage is made of substances, commonly known as additives, that upon being incorporated into a mineral oil impart certain desired characteristics thereto. Thus, those skilled in the art are aware of numerous additives that impart a desired property or a plurality of desired properties to oils and illustrative of such additives are substances that impart detergent characteristics, inhibit the tendency of oils to corrode metal bearings, and stabilize oils against oxidative deterioration.

Included in the known type of additives that impart detergency characteristics to mineral oils are phosphorus- and sulfur-containing-substances prepared by reaction of a phosphorus sulfide, e. g. phosphorus pentasulfide, with a suitable hydrocarbon and neutralization of the reaction product with a basic compound such as a hydroxide, a carbonate, or an oxide of a suitable metal. Since the art is aware of such additives that impart detergency characteristics to oils, it is not deemed necessary to describe such detergent substances in detail herein. However, for purposes of illustration, the following U. S. patents disclose such phosphorus sulfide-hydrocarbon reaction products that may be neutralized with a basic compound to prepare detergent additives: 2,316,078, 2,316,080, 2,316,081, 2,316,082, 2,316,088, 2,316,089 and 2,316,091.

Also included in the known type of additives, and particularly useful for stabilizing oils against oxidative deterioration and/or as inhibitors against metal corrosion, are products obtained by reaction of a phosphorus sulfide, e. g. phosphorus pentasulfide, with a terpene or terpene-containing substance. Here again, the art is fully aware of numerous reaction products of that type that function as aforesaid when incorporated, usually in small amounts, in an oil. Thus, it is also deemed unnecessary to discuss such substances in detail herein, but for purposes of illustration are phosphorus sulfide-terpene or terpene-containing fraction reaction products disclosed in patents such as the following: U. S. Patents Nos. 2,389,377, 2,455,668 and 2,392,252.

Prior to the discovery of the inventive concept on which the present invention is based, it was found that the use of corrosion-inhibiting phosphorus sulfide-terpene reaction products in mineral oils provided compositions that had a decided tendency towards instability evidenced by evolution of sulfur-containing compounds and especially hydrogen sulfide. It was also found that when such terpene reaction products were used in an oil in combination with detergent phosphorus sulfide-hydrocarbon reaction products neutralized with certain metals and which neutralized products when used by themselves in an oil possessed little, if any, tendency towards evolution of hydrogen sulfide, said neutralized products greatly enhanced the aforesaid tendency of the terpene reaction product to form and liberate hydrogen sulfide, thus providing mineral oil compositions that, though they may possess desired detergency and corrosion-inhibiting characteristics, were objectionable from the viewpoint of instability and odor characteristics.

In accordance with this invention, improved mineral oil compositions that contain a corrosion-inhibiting phosphorus sulfide terpene reaction product and a detergent neutralized phosphorus sulfide-hydrocarbon reaction product may be prepared which are devoid of or substantially inhibited against the tendency of said terpene reaction product to liberate hydrogen sulfide. Such improved compositions may be prepared by incorporating into a mineral oil an oil-soluble corrosion-inhibiting phosphorus sulfide-terpene reaction product and a detergent phosphorus sulfide-hydrocarbon reaction product that is neutralized with an alkaline earth metal. As is apparent from the following description of the invention and the data set forth in the examples herein, use of alkaline earth metals, and particularly barium and calcium, for neutralization of the phosphorus sulfide-hydrocarbon reaction products, as compared to use of such reaction products neutralized with other metals, and especially potassium, enables the use of neutralized phosphorus sulfide-hydrocarbon reaction products in oils in combination with corrosion inhibiting phosphorus sulfide-terpene reaction products with obtainment of detergent, corrosion-inhibited oils that are devoid of or substantially inhibited against instability as evidenced by evolution of hydrogen sulfide.

In order to further describe the invention, and from the viewpoint of illustration but not limitation, the following examples are set forth. For purposes of comparison in order to illustrate the markedly improved results obtainable by practice of this invention, the examples contain several compositions which relate to mineral oil compositions containing a combination of additives such as contemplated herein except that the phosphorus sulfide-hydrocarbon reaction product employed was neutralized with a metal other than contemplated for practice of this invention. In the examples, the data set forth with respect to stability of the compositions as evidenced by H2S evolution were determined by both quantitative and qualitative tests as described hereinafter.

Qualitative method

Qualitatively, the presence of hydrogen sulfide in the composition under test was determined by the lead acetate method and comprised placing a measured amount of the oil in a quart bottle, vigorously shaking the bottle for one minute, inserting moistened lead acetate paper into the vapor phase in the bottle, and maintaining the lead acetate paper therein for fifteen seconds. The hydrogen sulfide present, if any, was qualitatively determined by the change in color, if any, of the lead acetate paper after the fifteen second exposure. As shown in the data set forth hereinafter, the examples were rated for the qualitative determination of H2S by use of a color scale of 0 to 6 wherein a rating of 0 represents substantially no change in color of the lead acetate paper upon said exposure evidencing the substantial absence of H2S whereas a color rating of 6 represents a dark colored paper evidencing the presence of a substantial amount of hydrogen sulfide. The ratings in between 0 and 6 represent an increasing amount of hydrogen sulfide as the rating increases from 0 to 6.

Qualitative method 600 mls. of the oil under test are placed in a 65 mm. diameter test tube which is immersed in a constant temperature bath maintained at 150° F. Clean, dry air is passed through the oil at a rate of 10 liters per hour for 2 hours and the air flow from the oil is directed by means of fritted glass bubbling tubes through a graduate containing 80 mls. of 1N NaOH. The solution is then neutralized with 30 mls. of 6N HCl and the hydrogen sulfide titrated with standard iodine solution (0.01N) using a starch end point. The number of milligrams of hydrogen sulfide per gallon of oil is calculated by use of the following formula:

$$X = \frac{(A-B).N.K.S}{600 \text{ mls.}}$$

Where:
$A$ = number of mls. $I_2$ required for sample.
$B$ = number of mls. $I_2$ required for blank.
$N$ = normality of $I_2$ solution.
$K$ = 17.04 mgs. H2S/mille-equiv. $I_2$.
$S$ = conversion factor 3785 cc./gallon.
$X$ = Mgs. H2S/gallon of oil.

EXAMPLE I (a)

A composition was prepared comprising, by weight, 61.00% of solvent extracted Pennsylvania neutral, 38.06% of conventional Pennsylvania bright stock, 0.41% of "Santolube 394C" and 0.53% of "Stan-Add 47." "Santolube 394C" is a commercially available additive useful as an oil deterioration and bearing corrosion-inhibitor and is understood to comprise the reaction product of phosphorus pentasulfide with pinene. "Stan-Add 47" is a commercially available additive useful as a detergent in mineral oils and is understood to comprise a neutralized product, obtained by use of potassium-containing neutralization agent, of the reaction product of a phosphorus sulfide with a high molecular weight hydrocarbon mixture formed by polmerization of a mixture of butenes. Several characteristic properties of "Santolube 394C" and the potassium neutralized "Stan-Add 47" are tabulated below:

|  | Santolube 394C | Stan-Add 47 |
| --- | --- | --- |
| Gravity, °API | 7.3 | 17-22. |
| Viscosity, SUS at 210° F | 75-120 | 250-300. |
| Sulfur, percent | 11.6-14.0 | 1% maximum. |
| Phosphorus, percent | 4.3-5.1 | 1.68-1.78. |
| Potassium, percent | 0 | 2.3-3.1. |
| Ash | less than 1% | about 8% (approx.). |
| Total Acid No. (electrometric) | | 3.5. |
| Total Base No. (electrometric) | | 16. |

The aforesaid composition was subjected to qualitative and quantitative determination of H2S after a period of two weeks and after a period of four weeks. The results were as follows:

|  | Qualitative | Quantitative (Mgs. H2S/gallon) |
| --- | --- | --- |
| After 2 weeks | 6 | 2.2 |
| After 4 weeks | 5 | 1.6 |

As is apparent from the foregoing example, the described combination of additives wherein the phosphorus sulfide-hydrocarbon reaction product has been neutralized with a potassium-containing neutralization agent exhibited a decided tendency to evolve H2S as shown by the values of 5 and 6 in the lead acetate test and values of 2.2 and 1.6 mgs. of H2S per gallon of oil in the quantitative method. Such values should serve, upon comparison with the values shown in the examples hereinafter wherein barium and calcium were used as the neutralizing metal, to illustrate the markedly improved results obtained by practice of this invention.

(1a)

A composition was prepared that was identical to that of Example I except that "Stan-Add L9103" was used instead of "Stan-Add 47." "Stan-Add L9103" is understood to be, similarly to "Stan-Add 47," a phosphorus sulfide reaction product of a polymerized mixture of butenes but, whereas "Stan-Add 47" is neutralized with a potassium-containing neutralization agent, "Stan-Add L9103" is neutralized with a barium-containing neutralization agent. Several characteristic properties of "Stan-Add L9103" are as follows:

| | |
| --- | --- |
| Gravity, °API | 17.8 |
| Viscosity, SUS at 210° F | 316.5 |
| Per cent sulfur | 1.06 |
| Per cent phosphorus | 1.33 |
| Per cent barium | 3.95 |
| Per cent ash | 8.8 |
| Per cent potassium | 0 |
| Total acid No. (electrometric method) | 1.5 |
| Total base No. (electrometric method) | 12.6 |

The composition containing "Stan-Add L9103" was subjected to quantitative and qualitative tests as aforedescribed with obtainment of the following results which show the marked improvement obtained by use of the barium neutralized additive as compared to use of the potassium-containing "Stan-Add 47."

|  | Qualitative | Quantitative |
|---|---|---|
| Two weeks' test | 0 | 0.2 |
| Four weeks' test | 0 | 0.1 |

(1b)

A composition was prepared that was identical to that of Example (1a) except that a calcium analog of "Stan-Add L9103" was used, the calcium-containing product having been prepared by refluxing a n-hexane solution of "Stan-Add L9103" with 2N sulfuric acid for 12 hours, separation of the aqueous phase containing precipitated barium sulfate and excess sulfuric acid from the hexane solution of the hydrolysis product of "Stan-Add L9103," and removal of hexane from the hydrolysis product by distillation. The hydrolysis product was then dissolved in xylene and refluxed for 8 hours with an aqueous slurry of calcium hydroxide, followed by decantation from the excess calcium hydroxide of the xylene solution of the calcium salt of the aforesaid hydrolysis product. The calcium salt thus produced possessed the following properties:

| Per cent phosphorus | 1.47 |
|---|---|
| Per cent sulfur | 1.0 |
| Per cent barium | 0.4 |
| Barium (mol. per cent) | 0.003 |
| Per cent calcium | 1.2 |
| Calcium (mol. per cent) | 0.03 |
| Ash | 5.9 |
| Total acid No. (electrometric) | 0.44 |
| Total base No. (electrometric) | 8.3 |

The composition containing the calcium analog of "Stan-Add L9103" was subjected to the aforesaid qualitative and quantitative tests with obtainment of the following results:

|  | Qualitative | Quantitative |
|---|---|---|
| Two weeks' test | 0 | 0.1 |
| Four weeks' test | 0 | 0.1 |

EXAMPLE II

A composition was prepared comprising, by weight, 60.14% of solvent extracted Pennsylvania neutral, 38.92% of conventional Pennsylvania bright stock, 0.53% of "Stan-Add L9103" described in the foregoing example and 0.41% of "Aerolube 250," the latter being a commercially available additive useful as an oil deterioration and bearing corrosion inhibitor and understood to comprise the reaction product of a phosphorus sulfide with a terpene or terpene-containing substance. Several characteristic properties of "Aerolube 250" are tabulated below:

| Gravity, °API | 6.5 |
|---|---|
| Viscosity, SUS at 210° F | 137.5 |
| Per cent sulfur | 14.8 |
| Per cent phosphorus | 4.1 |
| Per cent ash | 1.01 |

The composition of this example, upon being subjected to the qualitative and quantitative tests for $H_2S$ described hereinbefore, gave the following results:

|  | Qualitative | Quantitative |
|---|---|---|
| Four weeks' test | 2 | 0.2 |

A similar composition but in which the potassium-containing "Stan-Add 47" was used instead of the barium-containing "Stan-Add L9103" gave the following test results evidencing substantial evolution of $H_2S$ by use of the potassium-containing additive.

|  | Qualitative | Quantitative |
|---|---|---|
| Four weeks' test | 6 | 4.4 |

EXAMPLE III

A composition was prepared comprising, by weight, 60.14% of solvent extracted Pennsylvania neutral, 38.92% of conventional Pennsylvania bright stock, 0.53% of "Stan-Add L9103" described hereinbefore and 0.41% of "Oronite 235," the latter being a commercially available additive useful as an oil deterioration and bearing corrosion inhibitor and understood to comprise the reaction product of phosphorus sulfide with a terpene or terpene-containing substance. Several characteristic properties of "Oronite 235" are tabulated below:

| Gravity, °API | 6.9 |
|---|---|
| Viscosity, SUS at 210° F | 147 |
| Per cent sulfur | 10.6 |
| Per cent phosphorus | 4.0 |
| Per cent ash | 1.91 |

The aforesaid composition, upon being subjected to the qualitative and quantitative tests aforedescribed, gave the following results:

|  | Qualitative | Quantitative |
|---|---|---|
| Two weeks' test | 0 | 0.2 |
| Four weeks' test | 0 | 0.3 |

A similar composition, but in which the potassium-containing "Stan-Add 47" was used instead of the barium-containing "Stan-Add L9103" gave the following results:

|  | Qualitative | Quantitative |
|---|---|---|
| Four weeks' test | 5 | 0.6 |

Another composition was prepared comprising, by weight, 59.08% of solvent extracted Pennsylvania neutral, 38.20% of conventional Pennsylvania bright stock, 0.58% of "Oronite 235" and 2.14% of barium containing "Stan-Add L9103." Such a composition gave the following results under the aforedescribed qualitative and quantitative tests.

|  | Qualitative | Quantitative |
|---|---|---|
| Two weeks' test | 0 | 0.2 |
| Four weeks' test | 0 | 0.2 |

EXAMPLE IV

A composition was prepared comprising, by weight, 59.07% of solvent extracted Pennsylvania neutral, 37.68% of a conventional Pennsylvania bright stock, 2.14% of the barium containing "Stan-Add L9103" and 1.11% of "Lubrizol 718," the latter being a commercially available oil deterioration and bearing corrosion inhibitor understood to comprise a $P_2S_5$-terpene reaction product. Several characteristic properties of "Lubrizol 718" are as follows:

| | |
|---|---|
| Gravity, °API | 12.9 |
| Viscosity, SUS at 100° F | 1000 (approx.) |
| Per cent sulfur | 7.14 (minimum) |
| Per cent ash | about 3 to 4.5 |
| Per cent phosphorus | 2.63 (minimum) |

The aforesaid composition, upon being subjected to the qualitative and quantitative tests as aforedescribed gave the following values:

| | Qualitative | Quantitative |
|---|---|---|
| Two weeks' test | 0 | 0.1 |
| Four weeks' test | 0 | 0.2 |

As is apparent from the foregoing illustrative data, practice of this invention using a combination of additives as aforesaid and wherein one component is a phosphorus sulfide-hydrocarbon reaction product neutralized with an alkaline earth metal, specifically barium or calcium, enables preparation of highly suitable mineral oil compositions devoid of or markedly inhibited against a tendency towards instability evidenced by hydrogen sulfide evolution and hence, of markedly improved odor characteristics. Although, from an illustrative aspect, the invention has been described by use of lubricating fractions derived from a Pennsylvania crude, the invention is not intended to be limited thereto as the invention may be suitably practiced with fractions derived from other crudes, a specific illustration thereof being lubricating oil fractions deribed from Mid-Continent crudes. Additionally, and although specific concentrations of the additives have been set forth in the examples used for illustrative purposes, it is not intended that the invention be limited thereto as the invention may be suitably practiced by use of the additives over a rather wide range of concentrations. Illustratively, and with respect to the detergent neutralized product of a phosphorus sulfide-hydrocarbon reaction, a concentration thereof ranging from about 0.1 to about 20% may be used, and a concentration of about 0.1% to about 2.0% for the corrosion-inhibiting phosphorus sulfide-terpene reaction product. Normally, the higher concentrations are preferred for compositions intended for heavy duty usage with the actual concentration employed being as low as possible consistent with economic considerations coupled with obtainment of the desired property or properties which it is intended that the additive impart to the oil composition.

Although the present invention has been described in conjunction with certain preferred embodiments thereof, those skilled in the art will readily recognize that variations and modifications can be made. Thus, the compositions contemplated herein may also contain other additives in order to impart additional desired properties to the compositions and, in illustration, the compositions may contain pour point depressing and viscosity index improving additives such as the polyacrylates, anti-foam agents such as those of the silicone type known to the art, etc.

I claim:

1. A composition comprising a mineral oil in major amount based on the weight of the composition and a combination of ingredients as defined hereinafter, one of said ingredients being an oil-soluble oil deterioration-inhibiting phosphorus- and sulfur-containing product of reaction between a terpene and a phosphorus sulfide and present in said composition in a small amount sufficient to inhibit deterioration of said oil and the other ingredient being an oil-soluble phosphorus- and sulfur-containing metal salt of a product of reaction between a phosphorus sulfide and a hydrocarbon, said salt being characterized in that its metal component is an alkaline earth metal effective to provide a salt that inhibits the tendency of the aforesaid terpene reaction product to evolve H₂S and said salt being present in said composition in a small amount sufficient to provide in combination with said deterioration-inhibitor in said oil a composition inhibited against substantial evolution of hydrogen sulfide.

2. A composition, as defined in claim 1, wherein the mineral oil is of lubricating grade.

3. A composition, as defined in claim 1, wherein the metal salt is an alkaline earth metal salt of a product of reaction between a phosphorus sulfide and an olefin.

4. A composition, as defined in claim 1, wherein the phosphorus sulfide is phosphorus pentasulfide.

5. A composition, as defined in claim 1, wherein the metal salt is an alkaline earth metal salt of a product of reaction between a phosphorus sulfide and a polymerized olefin.

6. A composition, as defined in claim 5, wherein the polymerized olefin is a polymerized mixture of low molecular weight olefins.

7. A composition, as defined in claim 6, wherein the polymerized mixture of low molecular weight olefins is a polymerized mixture of butenes.

8. A composition comprising a mineral oil of lubricating grade in major amount based on the weight of the composition and a combination of ingredients as defined hereinafter, one of said ingredients being an oil-soluble oil deterioration-inhibiting phosphorus- and sulfur-containing product of reaction between a terpene and a phosphorus sulfide and present in said composition in a small amount sufficient to impart oil deterioration-inhibiting properties to said composition, and the other ingredient being an oil-soluble phosphorus- and sulfur-containing detergent metal salt of a product of reaction between a phosphorus sulfide and polymerized butenes, said metal being a member from the group consisting of calcium and barium, and said metal salt being present in said composition in a small amount sufficient to impart detergent properties and to provide in combination with said deterioration-inhibitor in said oil a composition inhibited against substantial evolution of hydrogen sulfide.

9. A composition, as defined in claim 8, wherein the phosphorus sulfide is phosphorus pentasulfide.

10. A composition comprising a mineral oil in major amount based on the weight of the composition and a combination of ingredients as defined hereinafter, one of said ingredients being an oil-soluble oil deterioration-inhibiting phosphorus- and sulfur-containing product of reaction between a terpene and a phosphorus sulfide and present in said composition in a small amount sufficient to inhibit deterioration of said oil and the other ingredient being an oil-soluble phosphorus- and sulfur-containing metal salt of a product of reaction between a phosphorus sulfide and a hydrocarbon and present in said composition in a small amount sufficient to provide in combination with said deterioration-inhibitor in said oil a composition inhibited against substantial evolution of hydrogen sulfide, said metal salt being characterized in that the metal component thereof is a member from the group consisting of barium and calcium.

11. A composition comprising a mineral oil in major amount based on the weight of the composition and a combination of ingredients as defined hereinafter, one of said ingredients being an oil-soluble oil deterioration-inhibiting phosphorus- and sulfur-containing product of reaction between a terpene and a phosphorus sulfide and present in said composition in a small amount sufficient to impart oil deterioration-inhibiting properties to said composition, and the other ingredient being a detergent oil-soluble phosphorus- and sulfur-containing metal salt of a product of reaction between a phosphorus sulfide and a hydrocarbon, said salt being characterized in that its metal component is an alkaline earth metal effective to provide a salt that inhibits the tendency of the aforesaid terpene reaction product to evolve H₂S and said salt being present in said composition in a small amount sufficient to impart detergent properties and to provide in combination with said deterioration-inhibitor in said oil a composition inhibited against substantial evolution of hydrogen sulfide, said composition being characterized by having a substantially decreased tendency to evolve hydrogen sulfide as compared to such a composition but in which the detergent is a potassium salt of the product of reaction between the phosphorus sulfide and hydrocarbon.

JOHN W. BISHOP.

References Cited in the file of this patent

UNITED STATES PATENTS

| Number | Name | Date |
|---|---|---|
| 2,422,585 | Rogers et al. | June 17, 1947 |
| 2,496,508 | Watson et al. | Feb. 7, 1950 |
| 2,510,031 | Folda | May 30, 1950 |